United States Patent [19]

Mole et al.

[11] 4,034,248
[45] July 5, 1977

[54] SEGMENTED MAGNET HOMOPOLAR TORQUE CONVERTER

[75] Inventors: Cecil J. Mole, Monroeville; William C. Brenner, Pittsburgh, both of Pa.

[73] Assignee: Westinghouse Electric Corporation, Pittsburgh, Pa.

[22] Filed: Aug. 22, 1975

[21] Appl. No.: 607,009

Related U.S. Application Data

[63] Continuation of Ser. No. 346,534, March 30, 1973, now Defensive Publication No. T921,004.

[52] U.S. Cl. .......................... 310/178; 310/102 R; 310/113; 310/219
[51] Int. Cl.² ........................................ H02K 31/00
[58] Field of Search .... 310/178, 67, 219, 212–214, 310/266, 102, 112–114; 322/48; 290/11; 318/253

[56] References Cited

UNITED STATES PATENTS

| 2,563,577 | 8/1951 | Bowes | 310/102 |
| 3,168,666 | 2/1965 | Grobel | 310/219 |
| 3,308,318 | 3/1967 | Dunaiski | 310/114 |
| 3,369,139 | 2/1968 | Neumann | 310/102 |
| 3,462,626 | 8/1969 | Kluss | 310/67 |
| 3,944,865 | 3/1976 | Jewitt | 310/178 |

Primary Examiner—R. Skudy
Attorney, Agent, or Firm—G. H. Telfer

[57] ABSTRACT

A homopolar motor and a homopolar generator are concentric and radially displaced from one another to provide a torque conversion arrangement. The motor and generator circuits are internally connected by stationary conductors to provide a closed loop current path.

7 Claims, 3 Drawing Figures

SEGMENTED MAGNET HOMOPOLAR TORQUE CONVERTER

This is a continuation of application Ser. No. 346,534 filed Mar. 30, 1973, now a Defensive Publication No. T921,004.

BACKGROUND OF THE INVENTION

1. Field of the Invention

This invention relates primarily to torque conversion (power transmission), and more specifically, this invention relates to a torque converter utilizing homopolar machines having segmented magnets for excitation.

2. Description of the Prior Art

There are many applications that require light weight, variable speed drives. For example, a constant torque, variable speed drive could be utilized in conjunction with a ship propeller having a fixed pitch to replace a controllable pitch propeller.

Prior art devices have utilized homopolar generator and motor arrangements to provide torque conversion, as illustrated by U.S. Pat. No. 1,507,825 — Gill et al.; U.S. Pat. No. 2,979,630 — Bishop et al.; U.S. Pat. No. 3,163,792 — Sayers; and U.S. Pat. No. 3,383,532 — Zeisler et al. All of these patents relate to arrangements in which homopolar machines are located on a common axis and are interrelated to perform a torque conversion function. In U.S. Pat. No. 2,408,080 — Lloyd, there are disclosed various types of structures utilizing homopolar machines for the transmission of power. In FIG. 3 of this patent there is illustrated a structure in which the homopolar machines are concentric, with one having a smaller radial dimension than the other so that it fits into the other.

Although the prior art does not seem to teach the utilization of a plurality of excitation magnets for each of the homopolar machines in a torque converter, such a plurality of excitation magnets (segmented magnets) have been suggested for use with homopolar machines. Examples of such structures may be found in U.S. Pat. No. 339,772 — Hering and in the Morse patents, U.S. Pat. Nos. 1,271,061; 1,327,349; and 1,327,350.

None of these prior art arrangements poses a very desirable solution to the problems involved in interconnecting the homopolar machines and of eliminating the conductors outside the device. As a result, these devices are relatively large and heavy and yet permit the utilization of only relatively small currents. In addition, the efficiencies of these devices are relatively low.

SUMMARY OF THE INVENTION

In order to obviate the difficulties of prior art devices and to provide the desired lightweight, variable speed drive, efforts were instituted which resulted in the present invention. To achieve these results, a homopolar motor and a homopolar generator are each provided with a segmented magnet (i.e., a plurality of magnetic poles). Homopolar machines utilizing such a segmented magnet are illustrated in the copending application of C. J. Mole, entitled "Segmented Magnet Homopolar Dynamoelectric Machines Having Fluid Cooled Liquid Metal Current Collecting Zones", Ser. No. 338,489, filed Mar. 6, 1973, now a Defensive Publication No. T920,005 which application is now abandoned and of which application Ser. No. 605,964, filed Aug. 19, 1975 is a continuation.

In the device of the present invention, there are first and second rotating members, such as a generally cylindrical outer rotating member and a generally cylindrical inner rotating member. The rotating members carry a plurality of electrically conductive lengths or electrical conductors appropriately spaced thereon. In the case of a drum homopolar machine, which is the preferred embodiment disclosed herein, the conductors would be spaced along the axial length of the device; while in the case of a disc homopolar machine, the conductors would be radially spaced. The present invention relates to either of these types of homopolar machines.

Located between the rotating members is a stationary structure having first and second stationary members, such as a generally cylindrical outer stationary member and a generally cylindrical inner stationary member. The stationary members may be separated by a non-magnetic material. A plurality of magnetic poles are formed on the stationary members adjacent the conductors on the rotating members. The number of magnetic poles will depend upon the number of conductors spaced in the axial direction (drum homopolar machine) or in the radial direction (disc homopolar machine).

Current collecting means, such as a projecting ring that mates with a groove in an annular conducting member and is electrically connected thereto by a liquid metal, provides for the collection of current and transfer thereof from the rotating members to the stationary members. The portions of the current collecting means on the stationary members are connected by stationary interconnecting means, such as stationary conducting bars, to form a closed loop path for the current through the conductors carried by one of the rotating members, the collection means and the conductors carried by the other rotating member.

The magnetic poles may be formed by excitation windings located in slots on the stationary members. The portion of the current collection means located on the stationary members may be placed in these slots to minimize magnetohydrodynamic losses resulting from the effects of magnetic fields on the liquid metal.

To simplify the design, the conductors may be interconnected in the primary direction (axially in the case of a drum machine and radially in the case of a disc machine) to form a continuous conductive path. A single projecting ring and corresponding grooved annular member would be located at the common ends of each conductive length.

With this arrangement, a lightweight, variable speed drive having extremely desirable characteristics may be achieved. It will be extremely compact, very efficient over the entire speed range and relatively inexpensive to produce. The closed loop current path, evolved on a modular basis, reduces the problem of interconnecting the individual motor and generator by eliminating the conductors outside the machine. This reduces the physical size and weight of the machine and yet allows much higher currents to be used. These factors reduce the machine's size and weight, and permit a much higher efficiency to be achieved. The efficiency of this torque converter is very high over the entire speed range and should be, in general, always over 95 percent.

This device will convert high speed input drive to a variable low speed output drive for either forward or reverse operation, or vice versa. With suitable controls, this torque converter may be utilized to transform a variable speed input drive to a constant speed output drive. In addition, the excitation power requirements are very small and the excitation circuit inductances very low. These factors allow very rapid direction reversal and precise control of speed.

The foregoing and other objects, advantages and features of this invention will hereinafter appear, and for purposes of illustration, but not of limitation, exemplary embodiments of the subject invention are shown in the appended drawing.

DETAILED DESCRIPTION OF THE PREFERRED EMBODIMENTS

Figure 1:
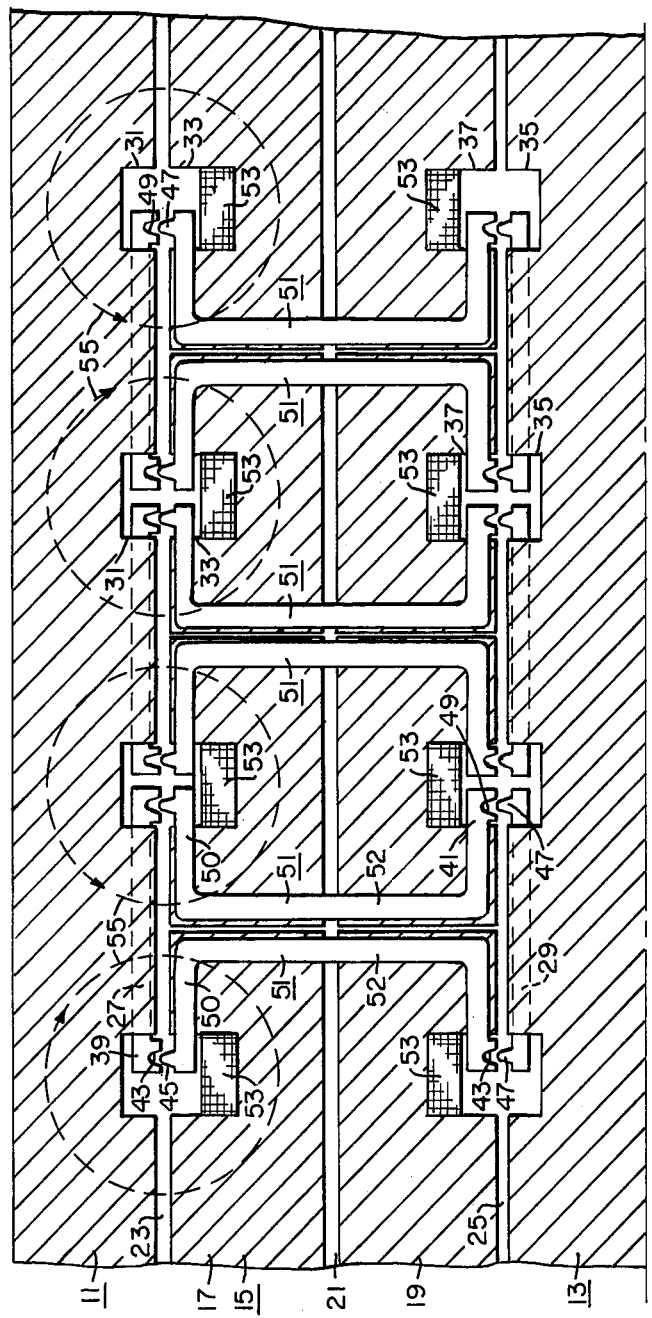
FIG. 1 is a partial, schematic, axial cross-sectional view illustrating a torque converter constructed in accordance with the present invention.

In FIG. 1, there is depicted a torque converter utilizing a homopolar generator and a homopolar motor for power transmission. In the particular embodiments described herein, drum-type homopolar arrangements are utilized, but it should be recognized that the principles are equally applicable to disc-type homopolar machines.

The composite torque converter with a homopolar generator and a homopolar motor has an outer rotating member 11 and an inner rotating member 13. Between outer rotating member 11 and inner rotating member 13 there is located a stationary structure 15. Stationary structure 15, which could be a unitary member, in this embodiment, has an outer stationary member 17 and an inner stationary member 19. Outer stationary member 17 and inner stationary member 19 are separated by a zone of non-magnetic material, such as an air gap 21. For some uses and by proper design of stationary structure 15, the non-magnetic material may not be used.

Rotating members 11 and 13 and stationary members 17 and 19 are at least partially formed of a ferromagnetic material, such as iron. These ferromagnetic portions may be either solid or laminated, or a combination of solid and laminated. Outer rotating member 11 is spaced from outer stationary member 17 to form an air gap 23; while inner rotating member 13 is spaced from inner stationary member 19 to form an air gap 25. In this particlar embodiment, the rotating members 11 and 13 and the stationary members 17 and 19 are generally cylindrical and concentric with one another.

A plurality of electrically conductive lengths or conductors 27 are carried by outer rotating member 11. Similarly, a plurality of electrically conductive lengths or conductors 29 are carried by inner rotating member 13. In the case of a drum-type homopolar arrangement, such as disclosed herein, conductors 27 and 29 are axially spaced along the machines. In a disc-type structure, on the other hand, the conductors 27 and 29 would be spaced along a radial direction. Further, the conductors 27 and 29 would not normally be a single conductor, but would usually be a set of conductors spaced in a circumferential direction. In other words, a set of conductors 27 would be located about the inner circumference of the outer rotating member 11, while a set of conductors 29 would be placed about the outer circumference of the inner rotating member 13. Thus, in practice, there would be a plurality of sets of conductors 27 and 29 spaced along the axial direction of the converter, the conductors in each set being spaced about the circumferences of the rotating members 11 and 13. The foregoing, of course, refers to the drum-type arrangement disclosed in FIG. 1, but the same type of result could be achieved in a disc-type structure by utilizing radially spaced sets of conductors, the conductors in each set being angularly spaced about the discs.

A series of slots 31 are formed in outer rotating member 11, and a corresponding series of slots 33 are formed in outer stationary member 17. Similarly, a series of slots 35 are formed in the inner rotating member 13, while a corresponding series of slots 37 are formed in the inner stationary member 19. Annular members 39 are located in slots 31, while annular members 41 are located in slots 37. Grooves 43 are formed in annular members 39 and 41.

Projecting rings 45 are located in slots 33, and projecting rings 47 are located in slots 35. Projecting rings 45 are adapted to mate with grooves 43 of annular members 39, while projecting rings 47 are adapted to mate with grooves 43 in annular members 41. A liquid metal 49 is located in grooves 43 to provide an electrically conductive path between projecting rings 45 and 47 and annular members 39 ad 41. The arrangement of annular members 39 and 41 and projecting rings 45 and 47 provides a current collecting arrangement to convey current from conductors 27 and 29 to the stationary structure 15.

Stationary electrically conducting members or bars 51 pass through stationary member 15 to interconnect a projecting ring 45 on stationary member 17 with an annular member 41 on stationary member 19. These electrically conducting bars 51 are formed and located to be in close proximity to conductors 27 and 29, and to each other, to minimize and/or eliminate development of fluxes in the circumferential direction which could saturate the iron and effectively increase the air gap. This is achieved by forming conducting bars 51 to have end portions 50 parallel to conductors 27 and 29 and body portions 52 adjacent one another. As a result of the utilization of the interconnecting bars 51, a closed current loop is provided which encompasses an electrical conductor 27, annular member 39, projecting ring 45, an interconnecting bar 51, an annular member 41, a projecting ring 47, an electrical conductor 29, and a return path to the other side of the electrical conductor 27 through other current collecting arrangements and another interconnecting bar 51. By the use of such an arrangement, no external conductors are necessary to interconnect the homopolar generator and the homopolar motor, and thus conductors outside the converter are eliminated. In addition, with this arrangement each conductor 27 (and its associated conductor 29) forms a complete module, so that the number of modules required for a given application may be easily determined and modules may be either added or subtracted for a given design.

In order to provide the requisite magnetic flux, windings 53 are located in slots 33 and 37. These windings may be made of either conventional conductors, or for some applications the use of superconducting windings may be desirable. In any event, the windings are located to produce magnetic poles in the vicinity of the conductors 27 and 29. As may be seen by the flux lines, schematically illustrated by dotted lines 55, adjacent windings are provided with currents having an opposite direction of flow in order to produce magnetic fluxes that cause voltages generated in conductors 27 and 29 to be additive in nature.

Figure 2:
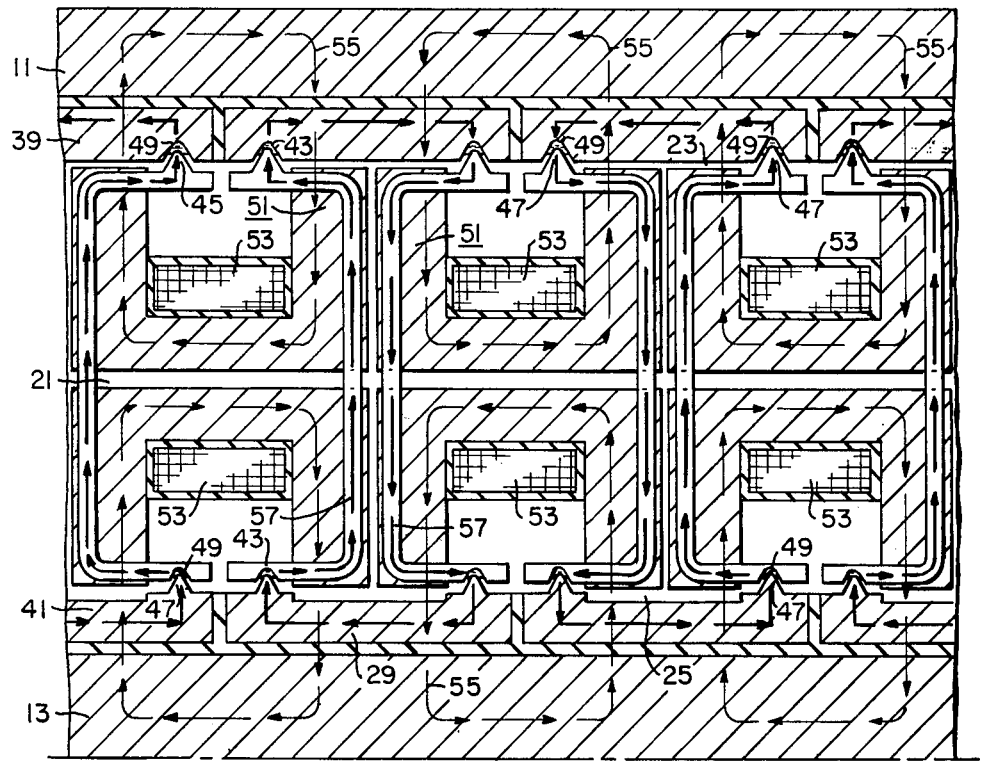
FIG. 2 is a partial, schematic, axial cross-sectional view further illustrating the operation of the embodiment of FIG. 1.

The torque converter of FIG. 1 is shown enlarged and in somewhat greater detail in FIG. 2. To aid in understanding the operation of the machine, the magnetic flux paths are illustrated by dot-dash lines 55. Also, the path of current flow between conductors 27 and 29 is illustrated by the continuous lines of arrows 57. Therefore, in addition to clarifying some of the details of this invention, this figure is particularly helpful in demonstrating the additive nature of the fluxes produced by windings 53 and the closed loop path that is provided for current from conductors 27 and 29.

Figure 3:
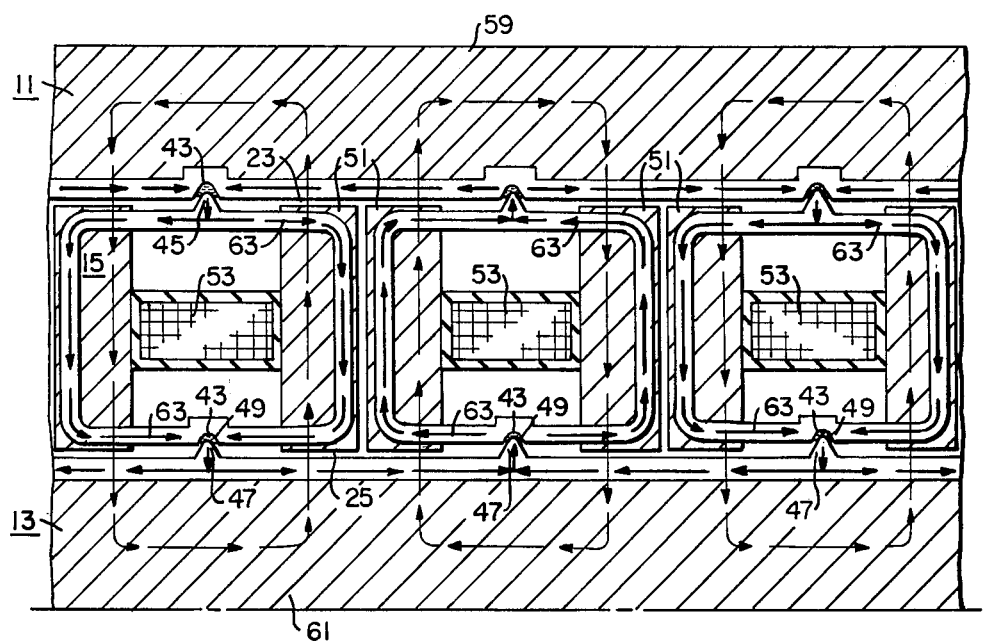
FIG. 3 is a partial, schematic axial cross-sectional view of another embodiment of a torque converter constructed in accordance with the present invention.

Another embodiment of the present invention is illustrated in FIG. 3. In this embodiment, the individual conductors 27 are electrically connected to form a continuous conductor 59. Similarly, the conductive lengths 29 are electrically connected to form a continuous conductor 61. As in the case of the individual conductors, there would be a plurality of the continuous conductors 59 and 61 spaced about the circumference of the inner and outer rotating members 11 and 13, respectively. By utilizing continuous conductors, the design and manufacture of the converter may be greatly simplified. The current flow through stationary interconnecting conductors 51 is illustrated by the lines 63. From this it may be seen that the same closed loop arrangement is produced, but only one projecting member 45 or 47, and the corresponding grooves 43, are needed between each of the conductive lengths. Therefore, a greatly simplified structure that yet exhibits the advantages of the embodiment of FIGS. 1 and 2 is provided.

It should be realized that for either the embodiment of FIG. 1 or of FIG. 3 the rotating member from which the output drive is obtained may be axially split to obtain a contrarotating drive system.

It should be understood that various modifications, changes and variations may be made in the arrangements, operations and details of construction of the elements disclosed herein without departing from the spirit and scope of the present invention.

We claim as our invention:

1. A torque converter comprising:
    first and second rotating members;
    a plurality of electrically conductive lengths carried by said rotating members;
    a stationary structure positioned between said rotating members;
    magnetic flux producing means mounted in said stationary structure producing lines of flux through which said conductive lengths pass;
    current collecting means to convey current from said conductive lengths carried by said rotating members to said stationary structure;
    stationary interconnecting means passing through said stationary structure to provide a closed loop through said conductive lengths carried by said first rotating member, said current collector means, and said conductive lengths carried by said second rotating member;
    adjacent ones of said conductive lengths being electrically connected to form continuous conductors carried by said rotating members;
    said first and second rotating members being inner and outer, respectively, generally cylindrical members concentric with one another;
    said current collecting means comprising projeting rings on said inner rotating member and the outer portion of said stationary structure between said conductive lengths, grooves formed in said stationary structure and in said outer rotating member to mate with said projecting rings on said inner rotating member and said stationary member, respectively, and liquid metal in said grooves to provide an electrically conductive path between said projecting rings and said grooves.

2. A torque converter comprising:
    a generally cylindrical outer rotating member carrying a plurality of electrical conductors located at intervals along the axial length thereof;
    a generally cylindrical outer stationary member concentric with and spaced inwardly from said outer rotating member;
    a plurality of magnetic poles located on said outer stationary member at positions corresponding to the placement of said electrical conductors of said outer rotating member;
    a generally cylindrical inner stationary member concentric with and spaced inwardly from said outer stationary member;
    a zone of non-magnetic material separating said inner and outer stationary members;
    a plurality of magnetic poles located at intervals along the axial length of said inner stationary member;
    a generally cylindrical inner rotating member concentric with and spaced inwardly of said inner stationary member, said inner rotating member carrying a plurality of electrical conductors located at intervals along the axial length thereof and corresponding to said magnetic poles of said inner stationary member;
    current collecting means to convey current from said electrical conductors carried by said inner and outer rotating members to said inner and outer stationary means, respectively; and
    stationary interconnecting means passing through said inner and outer stationary means to provide a closed loop through said conductors carried by said outer rotating member, said current collection means and said conductors carried by said inner rotating member.

3. A torque converter as claimed in claim 2 wherein said current collecting means comprises:
    projecting rings located on said outer stationary member and said inner rotating member, said projecting rings on said inner rotating member being electrically connected to the ends of said conductors carried thereby;
    annular members located on said outer rotating member and said inner stationary member, said annular members on said outer rotating member being electrically connected to the ends of said conductors carried thereby;
    grooves formed in said annular members, said projecting rings on said outer stationary member mating with said grooves of said annular members on said outer rotating member and said projecting rings on said inner rotating member mating with said grooves of said annular members on said inner stationary member; and liquid metal located in said grooves to provide an electrically conductive path between said projecting rings and said annular members.

4. A torque converter as claimed in claim 3 wherein said stationary interconnecting means provide electrical current paths between said annular members on said inner stationary member and said projecting rings on said outer stationary member.

5. A torque converter as claimed in claim 4 wherein said stationary interconnecting means comprises a plurality of stationary conducting bars, each of said stationary conducting bars having end portions closely adjacent said conductors and a body portion closely adjacent the body portion of an associated conducting bar.

6. A torque converter as claimed in claim 3 wherein:
slots are formed in said rotating members;
slots are formed in said stationary members opposite said slots formed in said rotating members; and
said projecting rings and said annular members are positioned in said slots.

7. A torque converter as claimed in claim 5 and further comprising excitation windings positioned in said slots in said stationary members.

* * * * *